United States Patent [19]

Kintz, Jr. et al.

[11] Patent Number: 4,531,071
[45] Date of Patent: Jul. 23, 1985

[54] ROTOR ASSEMBLY

[75] Inventors: Lawrence J. Kintz, Jr.; Joseph F. Rossie, both of Rockford, Ill.

[73] Assignee: Sundstrand Corporation, Rockford, Ill.

[21] Appl. No.: 560,852

[22] Filed: Dec. 12, 1983

[51] Int. Cl.³ .................... H02K 21/12; H02K 15/02
[52] U.S. Cl. .................................... 310/156; 29/598; 310/42; 310/261
[58] Field of Search ............... 310/152, 156, 162-164, 310/181, 217, 261, 264, 42, 218; 29/598

[56] References Cited

U.S. PATENT DOCUMENTS

| | | | |
|---|---|---|---|
| 2,163,496 | 6/1939 | Plötz | 310/42 |
| 2,163,528 | 6/1939 | Lauck | 310/42 |
| 2,502,185 | 3/1950 | Thomas | 310/217 |
| 2,637,825 | 5/1953 | Moore | 310/156 |
| 2,680,822 | 6/1954 | Brainard | 310/156 |
| 3,628,239 | 12/1971 | Hunt et al. | 310/42 |
| 3,971,124 | 7/1976 | Sasaki | 29/598 |
| 4,117,360 | 9/1978 | Richter | 310/183 |
| 4,127,786 | 11/1978 | Volkrodt | 310/156 |
| 4,144,469 | 3/1979 | Miyashita et al. | 310/156 |
| 4,322,648 | 3/1982 | Ray | 310/156 |
| 4,322,966 | 4/1982 | Adelski | 310/156 |
| 4,393,320 | 7/1983 | Anderson | 310/156 |
| 4,433,261 | 2/1984 | Nashiki et al. | 310/156 |

Primary Examiner—Peter S. Wong
Assistant Examiner—D. L. Rebsch
Attorney, Agent, or Firm—Wood, Dalton, Phillips, Mason & Rowe

[57] ABSTRACT

A rotor assembly for a rotary electric machine including a magnetic shaft provided with at least one pair of equiangularly spaced flats. Non-magnetic spacers abut the flats and a plurality of arcuate permanent magnet segments are disposed about the shaft between the spacers. A plurality of magnetic pole pieces are disposed radially outwardly of a corresponding one of the magnets and are disposed between adjacent spacers. Generally C-shaped channels of non-magnetic material overlie the spacers and interconnect adjacent ends of adjacent pole pieces to hold the components of the rotor in assembled relation.

11 Claims, 3 Drawing Figures

U.S. Patent   Jul. 23, 1985   4,531,071
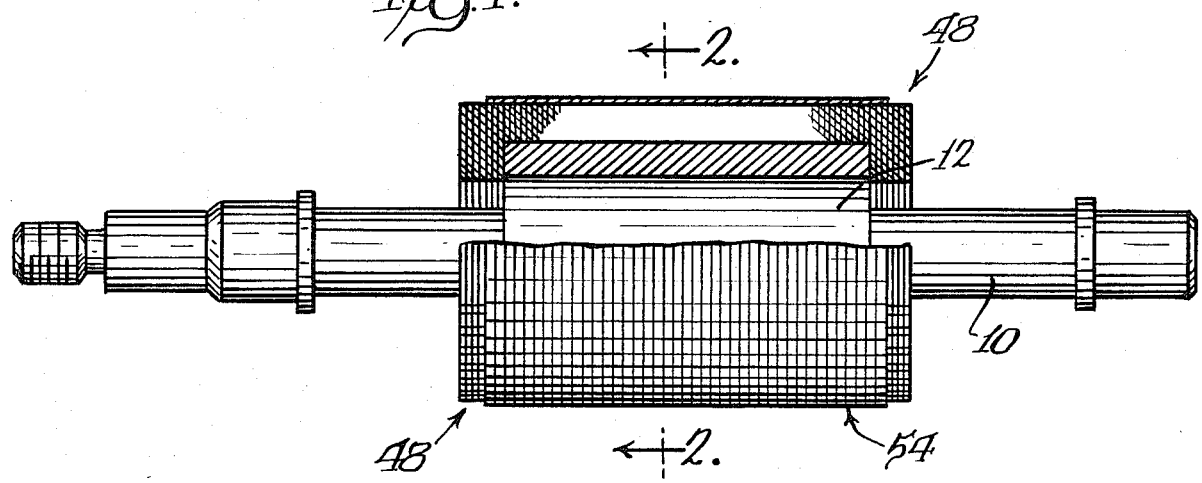
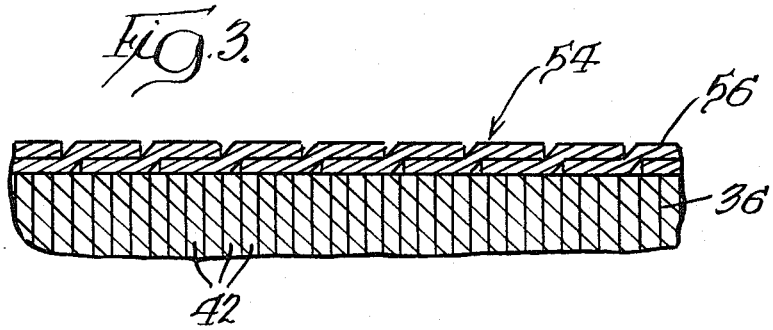

ROTOR ASSEMBLY

FIELD OF THE INVENTION

This invention relates to rotor assemblies for rotary electric machines, and more specifically to an assembly of rotor components including permanent magnets.

BACKGROUND ART

Prior art of possible relevance includes the following U.S. Pat. Nos.: 2,637,825 to Moore; 4,322,648 to Ray; 4,144,469 to Miyashita et al; 4,127,786 to Volkrodt; 4,322,996 to Adelski; 4,117,360 to Richter; and 3,971,124 to Sasaki.

Over the years, there have been a variety of proposals of rotor constructions wherein the various rotor components are separately assembled to a rotor shaft or the like and the above identified United States Patents are exemplary of specific efforts within this general endeavor. It is of course desirable that the components have relatively simple shapes, to minimize handling difficulties, as well as problems in the formation of the components. At the same time, it is necessary that the components be constructed so that they may be properly fitted together in such a way as to resist the centrifugal forces placed on them during operation of a rotary electric machine utilizing the rotor and that they be oriented with respect to each other in such a way that the functional role of iron laminations and/or permanent magnets is not degraded. Furthermore, it is necessary that the components be interfitted so as to resist changes in location due to acceleration or deceleration forces imposed on the rotor during start-up or shutdown.

SUMMARY OF THE INVENTION

It is the principal object of the invention to provide a new and improved rotor assembly. More specifically, it is an object of the invention to provide a rotor assembly made up of simply shaped parts that interfit without degradation of the functional role of pole pieces or permanent magnets, is capable of resisting the centrifugal forces incurred during operation, and prevents relative movement of parts due to acceleration or deceleration forces.

An exemplary embodiment of the invention achieves the foregoing object in a rotor assembly for a rotary electric machine including a shaft which is journalled in the machine. At least one pair of locating means are disposed in the shaft and each locating means is equally angularly spaced from the adjacent locating means. Non-magnetic spacers, one for each of the locating means, are disposed about the shaft in predetermined relation by the locating means. A plurality of generally arcuate permanent magnet segments are disposed about the shaft between the spacers and a plurality of magnetic pole pieces, one for each magnet, are disposed radially outwardly of a corresponding magnet and disposed between the spacers. Non-magnetic retaining means overlie the spacers and interconnect the adjacent ends of adjacent pole pieces to hold the components of the rotor in assembled relation.

In one embodiment, the retaining means comprises a peripheral wrap of a fibrous material engaging the pole pieces.

In a preferred embodiment, the retaining means comprises strips having tongues received in slots in the pole piece ends. Preferably, the strips and tongues are defined by generally C-shaped channels.

In a highly preferred embodiment, the locating means comprise flats on the shaft abutted by flat surfaces on the spacers.

The spacers may comprise generally T-shaped elements with the top of the T disposed between adjacent magnets and the base of the T extending generally radially outwardly between adjacent ends of adjacent pole pieces.

Other objects and advantages will become apparent from the following specification taken in connection with the accompanying drawings.

DESCRIPTION OF THE DRAWINGS

FIG. 1 is an elevational view of a rotor made according to the invention with portions broken away for clarify;

FIG. 2 is a sectional view of the rotor taken approximately along the line 2—2 in FIG. 1; and FIG. 3 is an enlarged, fragmentary view of rotor laminations and an overlying wrap.

DESCRIPTION OF THE PREFERRED EMBODIMENT

An exemplary embodiment of a rotor assembly made according to the invention is illustrated in the drawings and with reference to FIG. 1 is seen to include a magnetic shaft 10 which is journalled in a rotary electric machine in which the rotor is to be used in any suitable and conventional fashion. Intermediate its ends, the shaft 10 includes an enlarged central section 12 which, as best seen in FIG. 2, includes two diametrically opposed flats 14 and 16. The flats 14 and 16 will be diametrically opposed for a two pole rotor whereas, if the invention is embodied in a rotor having four or more poles, there will be an additional number of the flats corresponding to the number of poles and each flat will be equally angularly spaced from the adjacent flat.

Each of the flats 14 and 16 is abutted by a respective spacer 18 or 20. The spacers 18 and 20 are formed of a non-magnetic material and are generally T-shaped in cross section as viewed in FIG. 2. The top of the T of each spacer 18 or 20 includes a flat surface 22 which abuts the corresponding flat 14 or 16. The base 24 of each spacer 18 or 20 extends radially outwardly.

Arcuate permanent magnet segments 26 having concave inner surfaces 28 and convex outer surfaces 30 abut the shaft enlargement 12 with their concave surfaces 28 on the circular periphery of the shaft enlargement 12 and have their ends 34 in abutment with the ends of the top of the T of each spacer 18 and 20. Thus, the spacers serve to interrupt any magnetic flux path between the ends of the permanent magnets 26.

Two magnetic pole pieces, each designated 36 overlie respective ones of the magnets 26. Each pole piece includes a concave inner surface 38 abutting the convex surface 30 of the associated magnet 26 as well as a convex outer surface 40. Each pole piece 36 is further made up of a series of laminations 42, as displayed in FIG. 3, of magnetic material such as iron as is well known.

As best seen in FIG. 2, the laminations forming each of the pole pieces 36 are provided with axially opening apertures 44 which are aligned with each other and which receive conventional rotor bars 46.

Referring to FIG. 1, the pole pieces 36 include end laminations, generally designated 48, through which the rotor bars 46 likewise extend.

Returning now to FIG. 2, at each of its ends, each pole piece 36 includes an axially extending groove 49 which opens radially outwardly. Retaining means in the form of axially extending strips defined by generally C-shaped channels 50 formed of non-magnetic material are utilized to unite the assemblage. It will be appreciated that the ends 52 of each C-shaped channel define longitudinally extending tongues which may be received in the slots 49 in each pole piece 36. Thus, as a result of this construction, the pole pieces 36 are essentially clamped together, holding the magnets 26 and spacers 18 and 20 in the previously described locations.

To prevent disassociation of the channels 50 during operation of the machine in which the rotor is installed, a wrap of fibrous tape as, for example, made of carbon fiber impregnated in epoxy resin is wound about the periphery of the rotor, engaging the radially outer, or convex surface 40 of each of the pole pieces 36, as well as the radially outer surface of each channel 50. As seen in FIGS. 2 and 3, this wrap is generally designated 54 and may be tape 56 wound in overlapping relation. Preferably, the winding is employed with a constant lead angle to give a 50% overlap of the tape segment as illustrated. After the tape is wound, the assembly may be then cured in an oven at a suitable temperature to cause the epoxy impregnating the tape to set up and harden.

In some instances it may be desirable to form the shaft 10 of other than magnetic material. In such a case, the enlarged central section 12 may be made in two parts. The first, shown at 58, may be a continuation of the shaft 10 of non-magnetic material. The second is a sleeve 60 formed of magnetic material, for example, shrunk fit on the first part 58. In this form of the invention, the flats 14 and 16 are formed on the sleeve 60. Of course, where a non-magnetic shaft is not required, the parts 58 and 60 may be integral.

As a consequence of the foregoing, it will be appreciated that each of the components of the rotor is of relatively simple shape leading to ease of manufacture and handling. The functional relationship between the magnets and the pole pieces is not degraded because of use of the spacers 18 and 20 while the channels 50 hold the components in assembled relationship against the forces generated during normal operation. The channels 50 are, in turn, held in place against disassociation due to such centrifugal forces by the winding 54.

Movement of the components relative to the shaft during the existence of acceleration or deceleration forces is prevented by the use of the flats 14 and 16 and mating flat surfaces 22 on the spacers 18 and 20. Flats are preferably employed because of the ease of forming them on the shaft. However, it is to be understood that other suitable non-circular surfaces could be employed in lieu thereof.

Finally, while the invention has been described in connection with a two pole rotor, it will be immediately appreciated by those skilled in the art that the invention may likewise be advantageously employed in rotors having four or more poles simply by increasing the number of flats on the shaft to equal the number of poles and likewise increasing the number of magnets, the number of spacers, the number of the channels and the number of pole pieces to equal the number of poles.

We claim:

1. A rotor assembly for a rotary electric machine comprising:
    a shaft adapted to be journalled in a rotary electric machine;
    at least one pair of locating means on said shaft, each said locating means being equally angularly spaced from the adjacent locating means;
    non-magnetic spacers, one for each locating means, disposed about said shaft in predetermined relation with and in abutment with said locating means;
    a plurality of generally arcuate permanent magnet segments disposed about said shaft between said spacers;
    a plurality of magnetic pole pieces, one for each magnet, disposed radially outwardly of a corresponding magnet and disposed between said spacers; and
    non-magnetic retaining means overlying said spacers and interconnecting the adjacent ends of adjacent pole pieces to hold the components of said rotor in assembled relation.

2. The rotor of claim 1 wherein said retaining means comprises a peripheral wrap of fibrous material engaging said pole pieces.

3. The rotor of claim 1 wherein retaining means comprise strips having tongues received in slots in said pole piece ends.

4. The rotor of claim 3 wherein said strips and tongues are defined by generally C-shaped channels.

5. The rotor of claim 1 wherein said locating means comprise flats on said shaft.

6. The rotor of claim 5 wherein said spacers are generally T-shaped with the top of the T having a flat surface abutting a corresponding one of said flats disposed between adjacent magnets and the base of the T extending generally radially outwardly between adjacent ends of adjacent pole pieces.

7. A rotor assembly for a rotary electric machine comprising:
    a shaft adapted to be journalled in a rotary electric machine;
    at least one pair of non-cylindrical non-circular locating surfaces on said shaft, each said locating surface being equally angularly spaced from the adjacent locating surface;
    non-magnetic spacers, one for each said locating surface, disposed about said shaft and having a non-circular surface in abutting and mating relation with a corresponding one of said locating surfaces;
    a plurality of generally arcuate permanent magnet segments disposed about said shaft between said spacers;
    a plurality of magnetic pole pieces, one for each magnet, disposed radially outwardly of a corresponding magnet each disposed between adjacent spacers; and
    non-magnetic retaining means interconnecting the adjacent ends of adjacent pole pieces to hold the components of said rotor in assembled relation.

8. The rotor of claim 7 wherein said retaining means comprise generally C-shaped channels opening radially inwardly and having their ends received in grooves or slots in said pole pieces and a non-magnetic peripheral wrap engaging the radially outer surfaces of said channels and said pole pieces.

9. A rotor assembly for a rotary electric machine comprising:
    a shaft adapted to be journalled in a rotary electric machine;

at least one pair of flats on said shaft, each said flat being equally angularly spaced from the adjacent flat;

non-magnetic spacers, one for each flat, disposed about said shaft with a flat surface in abutting relation with each of said flats;

a plurality of generally arcuate permanent magnet segments disposed about and engaging said shaft between said spacers;

a plurality of magnetic pole pieces, one for each magnet, disposed radially outwardly of a corresponding magnet and disposed between said spacers; and non-magnetic generally C-shaped retaining channels overlying said spacers and interconnecting the adjacent ends of adjacent pole pieces to hold the components of said rotor in assembled relation.

10. The rotor assembly of claim 9 wherein said shaft includes a sleeve of magnetic material and said flats are on said sleeve.

11. The rotor assembly of claim 10 wherein the portions of said shaft other than said sleeve are of non-magnetic material.

* * * * *